United States Patent [19]
DeGreef

[11] 3,767,073
[45] Oct. 23, 1973

[54] APPARATUS FOR EMPTYING A CRATE FILLED WITH FRUIT

[75] Inventor: Jan Antoon DeGreef, Tricht, Netherlands

[73] Assignee: DeGreef's Wagen-Carrosserie-en Machineboua N.V., Tricht, Netherlands

[22] Filed: Apr. 13, 1971

[21] Appl. No.: 133,679

[30] Foreign Application Priority Data
Apr. 16, 1970 Netherlands .................... 7005460

[52] U.S. Cl. ............................ 214/307, 214/314
[51] Int. Cl. ............................................. B65g 65/00
[58] Field of Search ................... 214/307; 222/405; 221/186, 190

[56] References Cited
UNITED STATES PATENTS

| | | |
|---|---|---|
| 2,670,091 | 2/1954 | Sinks ................................ 214/307 |
| 3,265,230 | 8/1966 | Thomas ............................ 214/307 |
| 2,727,641 | 12/1955 | Tomkins .......................... 214/307 |
| 2,074,383 | 3/1937 | Funk ................................ 214/307 |
| 3,598,279 | 8/1971 | Duffau ......................... 214/16.4 R |
| 3,651,967 | 3/1972 | Rooke et al. .................... 214/307 |
| 1,973,767 | 9/1934 | Kimball et al. .................. 214/314 |
| 2,702,138 | 2/1955 | Getty ............................... 214/314 |
| 2,307,194 | 1/1943 | Benning .......................... 214/312 |
| 2,314,647 | 3/1943 | Longenecker .................. 214/314 |

Primary Examiner—Robert G. Sheridan
Assistant Examiner—Lawrence J. Oresky
Attorney—Snyder and Butrum

[57] ABSTRACT

For emptying a bulk-fruit crate without damaging the fruit, the crate is placed on edge and the fruit is retained in the crate by a cover held on the crate while the latter is being tipped. For preventing damage of the fruit the flow of fruit from the top of the crate during the emptying thereof is controlled successively liberating the outlet opening of the crate from its top edge.

2 Claims, 4 Drawing Figures

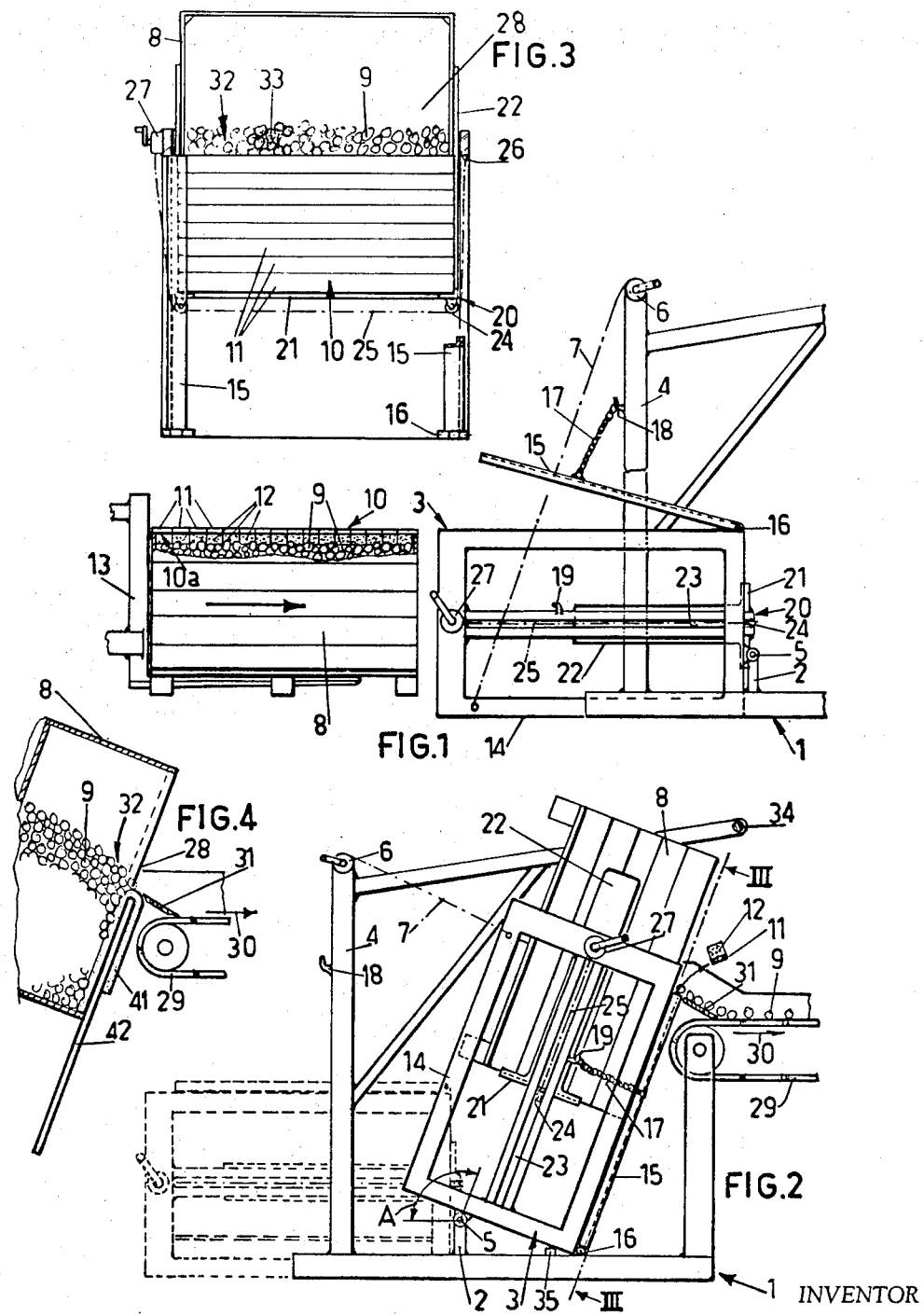

APPARATUS FOR EMPTYING A CRATE FILLED WITH FRUIT

It is difficult to empty bulk-fruit crates having the dimensions 75 × 114 × 114 cm, without damaging the fruit.

The invention relates to a method of emptying a bulk-fruit crate filled with fruit, wherein the crate is placed on edge, the fruit is retained in the crate by a cover held on the crate while the latter is being tipped, and wherein the flow of fruit from the crate during the emptying thereof is controlled by means of the cover.

In the known method of the above kind, a flap at the bottom edge of the cover is opened when the crate is in its tipped position, so that all the fruit can then flow out through the opening thus released. This opening is kept small enough to prevent an excessive amount of fruit from emerging from the crate simultaneously. With this method, the flow of fruit from the crate is anything but uniform. Various uncontrollable factors govern whether or not there is any jamming of the fruit moving towards the opening. The highly irregular flow of fruit is difficult to process by sorters who have to eliminate any rotting fruit. In the known method in question, the fruit emerges at considerable pressure, i.e., the pressure of the column of fruit in the crate, through a funnel-shaped outlet. This results in unacceptable damage to the fruit. More particularly, rotting fruit is squashed in this funnel-shaped outlet, so that other fruit is fouled and such fruit subsequently in turn fouls other fruit and other fruit handling equipment, e.g., conveyor belts and sorting machinery.

The object of the invention is to provide a method of the above kind in which the above disadvantages are avoided, and to this end the crate is emptied from its top by successively liberating the outlet opening of the crate from its top edge. With this method the flow of fruit can be controlled much more satisfactorily. If the fruit does not automatically roll out at a given time, the rolling movement can be initiated in the crate manually. With this method, the fruit rolls off the top surface of the slope of the fruit and out of the crate along a short distance. During this movement the fruit is not subject to the pressure of a column of fruit standing thereon. Moreover, the method according to the invention prevents the fruit from jamming with the risk of damage. The reason for this is that the passage for the flow of fruit does not narrow with the method according to the invention. Since, in the method according to the invention, fruit in the crate is released from the top surface of such fruit, all the fruit can be observed before emerging from the crate. Rotting fruit can then be removed manually or in some other way before emerging from position and hence before having the opportunity of fouling other sound fruit. Thus a group of rotting fruit forming a mass can be removed as a whole from the crate.

The invention also relates to an apparatus for emptying a bulk-fruit crate filled with fruit, comprising a cover for covering the crate to be emptied and comprising a tipping support member to receive the crate to be emptied. According to the invention this apparatus is improved by the fact that the cover has a passage opening which is successively released from its top edge.

A further developed apparatus according to the invention is characterised by a relative movement between the support member and a reception member which receives the fruit emerging from the crate, said movement resulting in keeping the bottom edge of the outlet opening of the cover at substantially the same level with respect to the reception member.

Preferably, the apparatus according to the invention comprises a lifting mechanism for lifting the support member with respect to a tipping frame. The heavy crate can then be supplied to the apparatus at a near ground level, while the fruit can be processed at an acceptable level by operators both before and immediately after emerging from the crate.

The above and other features of the invention will be apparent from the following description with reference to the drawing wherein:

FIGS. 1 and 2 are side elevations in partial section showing the apparatus according to the invention at the start and at a subsequent stage of the method according to the invention, respectively, and FIG. 3 is a section on the line III—III in FIG. 2.

FIG. 4 shows the crate in the dumping position.

The apparatus according to the invention comprises a frame 1 with bearing blocks 2 and an upright 4. A tipping frame 3 is mounted for tipping about the shaft 5 mounted in the bearing blocks 2 and can be tipped through an angle A of approximately 120° between a horizontal initial position (see FIG. 1) and an operative position (see FIG. 2), by means of a hand which 6 and a cable 7.

The bulk fruit crate 8 which contains fruit and which is to be emptied is covered by cover strips 10 each consisting of a lath 11 covered with a thick layer of elastic foam rubber 12 and is placed, for example by a fork-lift truck 13, on the base 14 of the tipping frame 3, while each of two cover supports 15 formed by angle-sections secured to the tipping frame 3 by hinges 16 is suspended by chains 17 from a hook 18 in a raised position. After the bulk fruit crate 8 has been placed on the base 14, the cover supports 15 are placed on the cover strips 10 and retained in this position by means of chains 17 hooked to hooks 19, the foam rubber 12 filling the space above the fruit 9. The tipping frame 3 is then tipped into the operative position against an abutment 35. A support member 20 is arranged slidably in the tipping frame 3 and consists essentially of a plate 21 having a guide profile 22 on each side, said profile 22 being axially slidable in a U-profile 23. The plate 21 has a pulley 24 on each side, the pulley being supported on a cable 25 which runs from an attachment 26 on the tipping frame 3 to a hand winch 27.

When the support member 20 is raised by the hand winch 27 with respect to the tipping frame 3, the top cover strip 10a is released from the cover supports 15 and can then be removed, the first fruits rolling out from the surface of the fruit through the freed passage opening 28 over a guide 31 to a reception member consisting of an endless belt 29 which moves in the direction of the arrow 30 and which is situated at an operative height of about 90 cm and which is readily operated by operators for sorting the fruit. The support member is then raised further, the cover strip 10b being released from the cover supports 15 and the passage opening being freed further. Thus during the raising of the support member 20 all the cover strips 10c, 10d and so on are removed successively until the crate is completely empty. In these conditions the fruits always roll off the slope 32 of the fruit 9. In the event of any rotting fruit 33 appearing at the slope 32, it will be visible through the opening 28 and the rotting fruit 33 is removed manually before such rotting fruit emerges automatically.

A crate support 34 prevents that the crate drops over when the latter has been raised to its end position.

After the crate has been emptied, the support member 20 is lowered, the tipping frame 3 together with the support member 20 and the crate is tipped back about the shaft 5, the cover supports 15 are again attached to the hook 18, the empty crate 8 is removed and the cover strips 10 are placed on the next crate 8 to be emptied.

In stead of a cover consisting of loose cover strips 10 a cover having a plurality of cover strips secured to one another in the form of the laths of a roller shutter may be applied.

In the variant shown in FIG. 4, the cover consists of a continuous strip 41 of foam rubber supported by a cover support 42 in the form of a plate. When the crate 8 is being emptied, the strip 41 is successively released from the top by means of the cover support 42 so that the fruit 9 rolls off the slope 32 through the outlet opening 28 over the guide 31 and on to the belt 29.

What is claimed is:

1. Apparatus for emptying a bulk-fruit crate filled with fruit, said crate having a bottom, upstanding sides and an open top, said apparatus comprising, in combination:

receiving means presenting a surface for receiving fruit emptied from a crate; and support means for presenting a crate adjacent said receiving means in operative position with the open top thereof facing downwardly and one end of the crate uppermost ; said support means including a crate-receiving frame mounted for pivotal movement between a loading position and said operative position of the crate about a horizontal axis adjacent one end of said frame and located below the level of said surface of the receiving means, said frame including a bottom portion disposed substantially horizontally when said frame is disposed in said loading position for supporting the crate by its bottom and an end support member at said one end of the frame for supporting the crate by the end thereof opposite said one end of the crate when said frame is disposed in said operative position, said support member being movable between the opposite ends of said frame; said support means also including means for elevating said support member when the frame is in said operative position for projecting the crate upwardly through said open opposite end of the frame, and cover means including cover support means on said frame for closing off the open top of the crate from said opposite end thereof to a level above said surface of the receiving means to expose a progressively deeper opening between the opposite sides of the crate above said level as the crate is elevated so that said transverse opening is presented above said surface, whereby to expose the top layer of the fruit for discharge to said surface.

2. Apparatus according to claim 1 wherein said cover support means is pivotally secured to said frame.

* * * * *

UNITED STATES PATENT OFFICE
CERTIFICATE OF CORRECTION

Patent No. 3,767,073            Dated  October 23, 1973

Inventor(s)  Jan Antoon De Greef

It is certified that error appears in the above-identified patent and that said Letters Patent are hereby corrected as shown below:

--- [73]     DeGreef's Wagen-Carrosserie-en
             Machinebouw N.V., Tricht, Netherlands---

Signed and sealed this 1st day of January 1974.

(SEAL)
Attest:

EDWARD M. FLETCHER, JR.           REND D. TEGTMEYER
Attesting Officer                 Acting Commissioner of Patents